Dec. 20, 1966  E. A. ROTH  3,292,679
MANUALLY OPERABLE POWER TRIMMER FOR FRUIT
AND VEGETABLE ARTICLES
Filed Jan. 28, 1964  2 Sheets-Sheet 2
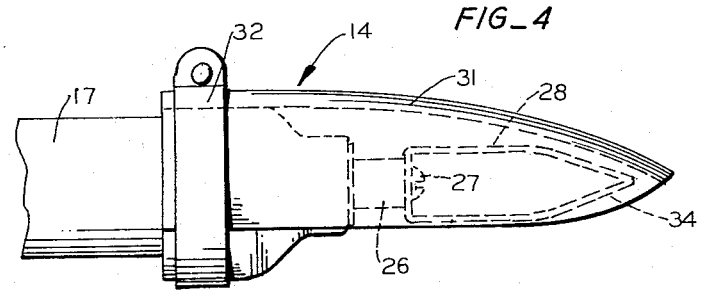
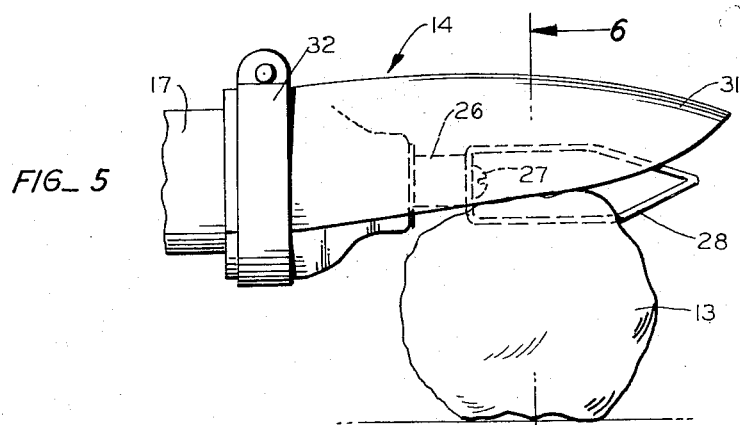
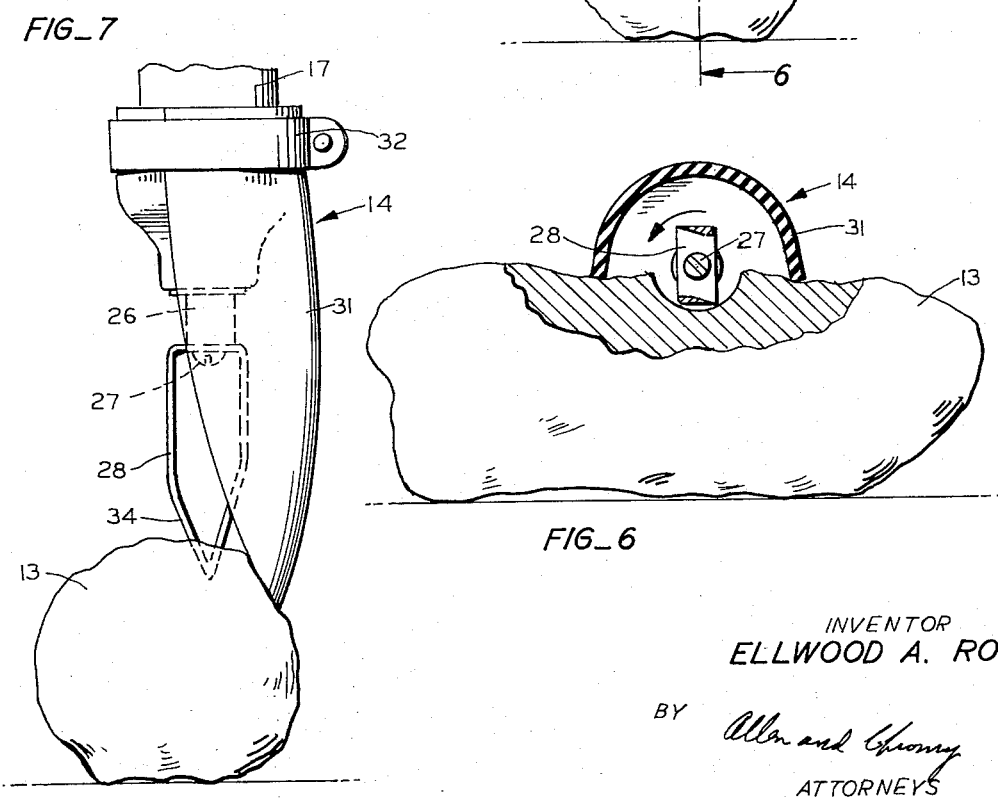
INVENTOR
ELLWOOD A. ROTH
BY
ATTORNEYS United States Patent Office 3,292,679
Patented Dec. 20, 1966

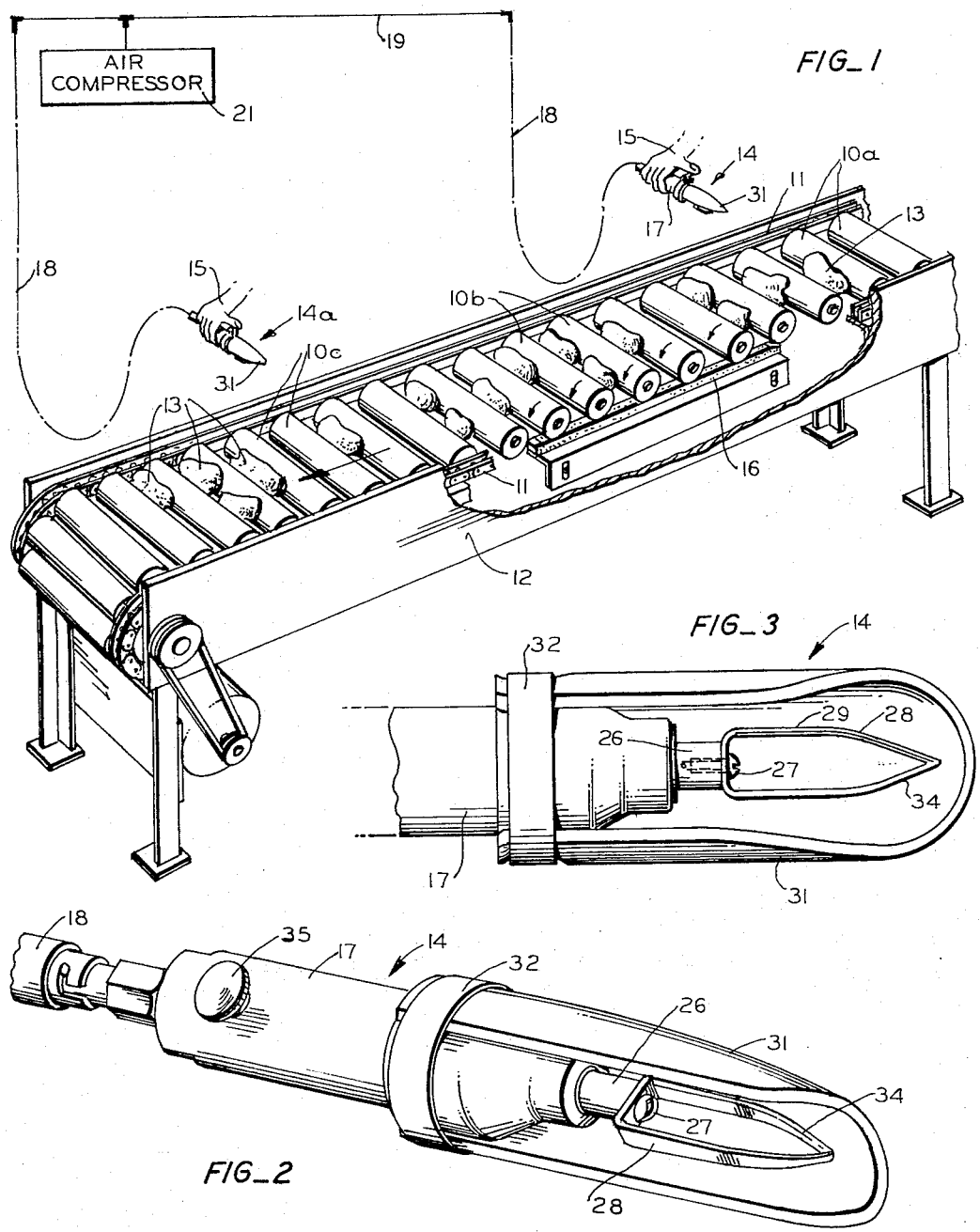

3,292,679
MANUALLY OPERABLE POWER TRIMMER FOR FRUIT AND VEGETABLE ARTICLES
Ellwood A. Roth, Campbell, Calif., assignor of one-half to Genevieve I. Magnuson, Saratoga, Calif., and one-half to Genevieve I. Magnuson, Robert Magnuson, and Lois J. Fox, trustees of the estate of Roy M. Magnuson, deceased
Filed Jan. 28, 1964, Ser. No. 340,757
3 Claims. (Cl. 146—204)

The present invention relates to trimming of vegetables and fruit articles and is concerned more particularly with the provision of a power-operated trimmer which is controlled manually by the operator and is connected by a flexible power connection to the source of power.

It is the general object of this invention to provide an improved manually controlled, power-operated trimming apparatus for fruit and vegetable articles.

Another object of the invention is to provide a manipulable power trimmer which is very flexible in its use and is easily moved by the operator to engage a fruit or vegetable article which is supported, preferably on a table or a conveyor, in front of the operator.

A further object of this invention is to provide a rotatable knife which is closed at a sharpened end and has two symmetrically arranged blades which successively cut in performing a trimming operation on fruit. together with a flexible, resilient guard which normally substantially covers the knife, but can be deflected or pushed out of the way when engaged with an article to be trimmed.

Other objects and advantages of the invention will be apparent from the following description of a preferred embodiment thereof, in which:

FIG. 1 is a perspective view of apparatus employing the present invention;

FIG. 2 is a perspective view of the manipulable vegetable or fruit article trimmer;

FIG. 3 is an elevational view of the trimmer looking at the open side of the guard;

FIG. 4 is an elevational view looking at the side of the guard and showing the knife therein in dotted lines;

FIG. 5 is an elevational view showing the trimmer engaged with and trimming a vegetable article;

FIG. 6 is a sectional view taken along the lines 6—6 in FIG. 5; and

FIG. 7 is another operational view of the trimmer as engaged with a vegetable article.

The trimming apparatus of the present invention includes vegetable supporting means in the form of a roller conveyor including roller 10 carried by respective chains 11 and supported on the frame 12 in a conventional manner. The individual rollers 10 are successively maintained stationary or rotated to shift the position of articles on the conveyor so as to expose another face thereof. The rollers indicated at 10a, for example, are stationary, so that an article 13 can be engaged by a trimmer 14 so as to remove a bad spot by the manipulation of the operator's hand 16. The next set of rollers 10b are engaged with a stationary member 16 so as to be rotated as they travel along and to cause the articles 13 supported thereon to be rotated or shifted so as to expose another surface so that at a subsequent station 10c of the rollers they are again stationary for inspection of an operator and removal of any bad spots by means of a second trimmer 14a. Both the trimmers 14 and 14a in the present instance are powered by respective air motors 17 comprising the handle portion of the trimmer, and each air motor is connected by an air hose 18 and air conduit 19 to an air compressor 21 or other suitable source of power. Alternatively, the trimmer 14 can be electrically driven and connected by a flexible electric cord instead of a flexible air hose to a suitable source of power.

The air motor 17 (FIGS. 3 and 4) is provided with a driven shaft 26, which is threaded at its end to receive a screw 27 which fastens a knife 28 on the shaft 27. The knife has a closed configuration with opposed parallel portions 29, and tapering portions 30, which meet at a point. The two opposite parallel portions 29 of the knife and the tapering portions 34 are sharpened so as to have cutting edges facing the direction or rotation so that each side of the knife performs a cutting operation. The air motor 17 may be provided with a suitable valve control 15 so that the motor can be turned on and off as desired.

A flexible guard 31 (FIGS. 2–7) of rubber or plastic is provided which is secured on the air motor 17 by means of a conventional clamping band 32. This flexible guard is open at one side, as seen in FIG. 3, and has its opposite sides tapered to form a rounded tapering end adjacent to the pointed end of the knife. End of the guard is narrow when viewed from the side, as seen in FIG. 4, and to provide a broad surface guard when viewed from the open side, as seen in FIG. 3. It will be noted, from looking at FIG. 4, for example, that the knife is almost entirely housed within the guard 31 in its normal unflexed position, but when the knife is engaged with an article to cut out a bad spot, as seen, for example in FIG. 5, the guard 31 will flex and allow the knife to project beyond the guard so as to perform the trimming operation. The respective knife edges as seen in FIG. 6 perform a clean cut on the article in accordance with the amount of pressure exerted by the operator.

FIG. 7 shows a view in which the end of the knife is used to remove a bad spot, the guard 31 flexing away to provide access.

It will be seen that the air motor 17 provides a handle remote from the knife so that the trimmer can be manipulated by the operator without fear of slipping and being hurt during the trimming operation.

While I have shown and described a preferred embodiment of the invention, it is apparent that the invention is capable of various modifications and variations from the form shown so that the scope thereof should be limited only by the scope of the claims appended hereto.

What I claim is:

1. In a manually operable, power-operated trimmer of food articles, a motor comprising a handle, a knife projecting from one side of the motor and driven thereby, a flexible guard partially disposed about the knife and providing an open side by means of which the knife may be engaged with a food article, and a flexible power connection extending from the motor for operating the motor and the knife, said knife having opposite sides substantially parallel to each other with similar edges thereof sharpened, said sides converging at their junction in a sharpened apex, whereby the knife can be used to cut with the apex or with the sides thereof.

2. In a manually operable, power operated trimmer of food articles, a motor comprising a handle, a knife projecting from one side of the motor and driven thereby, said knife being double edged and converging to a point at the junction of said double edges, and a flexible guard supported by and projecting from the motor and partially encompassing the knife, said guard having an open side, and the end of said guard tapering from the general plane of the open side of the guard to generally correspond to the convergence of said knife and enable access of the end of said knife to an article to be trimmed.

3. In a manually operable, power operated trimmer of food articles as recited in claim 2, in which said guard when viewed from the open side thereof presents a full width face or body portion with a rounded end, and when viewed at right angles to said open end presenting a narrow body portion having a tapering end.

References Cited by the Examiner

UNITED STATES PATENTS

| | | | |
|---|---|---|---|
| 927,904 | 7/1909 | Wagenhauser et al. | 146—52 |
| 2,958,355 | 11/1960 | Young | 146—204 |
| 3,164,183 | 1/1965 | Kirkpatrick | 146—204 |

FOREIGN PATENTS 979,885  12/1950  France.

ROBERT C. RIORDON, *Primary Examiner.*
W. GRAYDON ABERCROMBIE, *Examiner.*